United States Patent [19]

Vance

[11] 4,221,532
[45] Sep. 9, 1980

[54] ARTICLE TRANSFERRING APPARATUS

[75] Inventor: Craig Vance, Woronoco, Mass.

[73] Assignee: Automated Parts Remover, Inc., Indian Orchard, Mass.

[21] Appl. No.: 852,097

[22] Filed: Nov. 16, 1977

[51] Int. Cl.² .......................................... B65G 47/90
[52] U.S. Cl. ................................. 414/729; 198/486; 414/728; 414/744 R; 414/416; 425/436 R; 425/451.9
[58] Field of Search .................. 214/1 R, 1 B, 1 SB, 214/1 BB, 1 BT, 147 T, 1 BD, 1 BV, 1 BH, 1 BO; 425/436 R, 436 RM, 451.9; 198/486; 414/728, 729, 744, 416

[56] References Cited

U.S. PATENT DOCUMENTS

| | | | |
|---|---|---|---|
| 2,713,426 | 7/1955 | Drew | 214/1 BB |
| 3,841,499 | 10/1974 | Bullard | 214/1 BD |
| 3,947,208 | 3/1976 | Broderick | 425/436 R |

Primary Examiner—Frank E. Werner
Attorney, Agent, or Firm—Chapin, Neal & Dempsey

[57] ABSTRACT

An apparatus for transferring an article between two mutually spaced locations comprises a rotatable and longitudinally translatable shaft, a sweep arm fixed to the shaft and adapted to carry suitable apparatus for gripping the article, a first drive motor operably connected to the shaft for imparting longitudinal movement thereto and a second drive motor, independent from the first and operably connected to the shaft for imparting rotational movement thereto. The apparatus is characterized by an economy of manufacture, efficiency of operation and a compactness which renders the apparatus suitable for adaptation o a variety of manufacturing environments.

3 Claims, 5 Drawing Figures

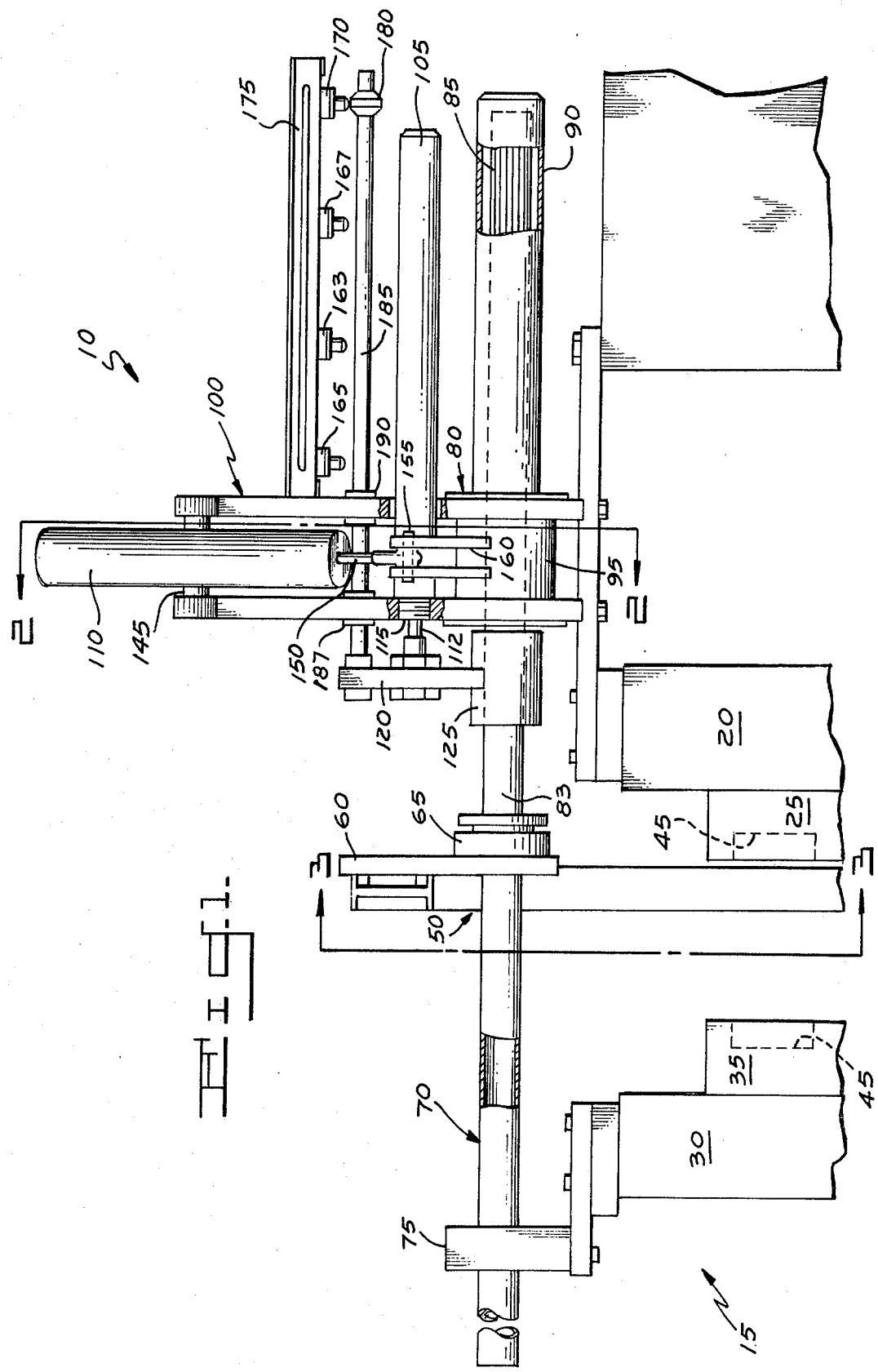

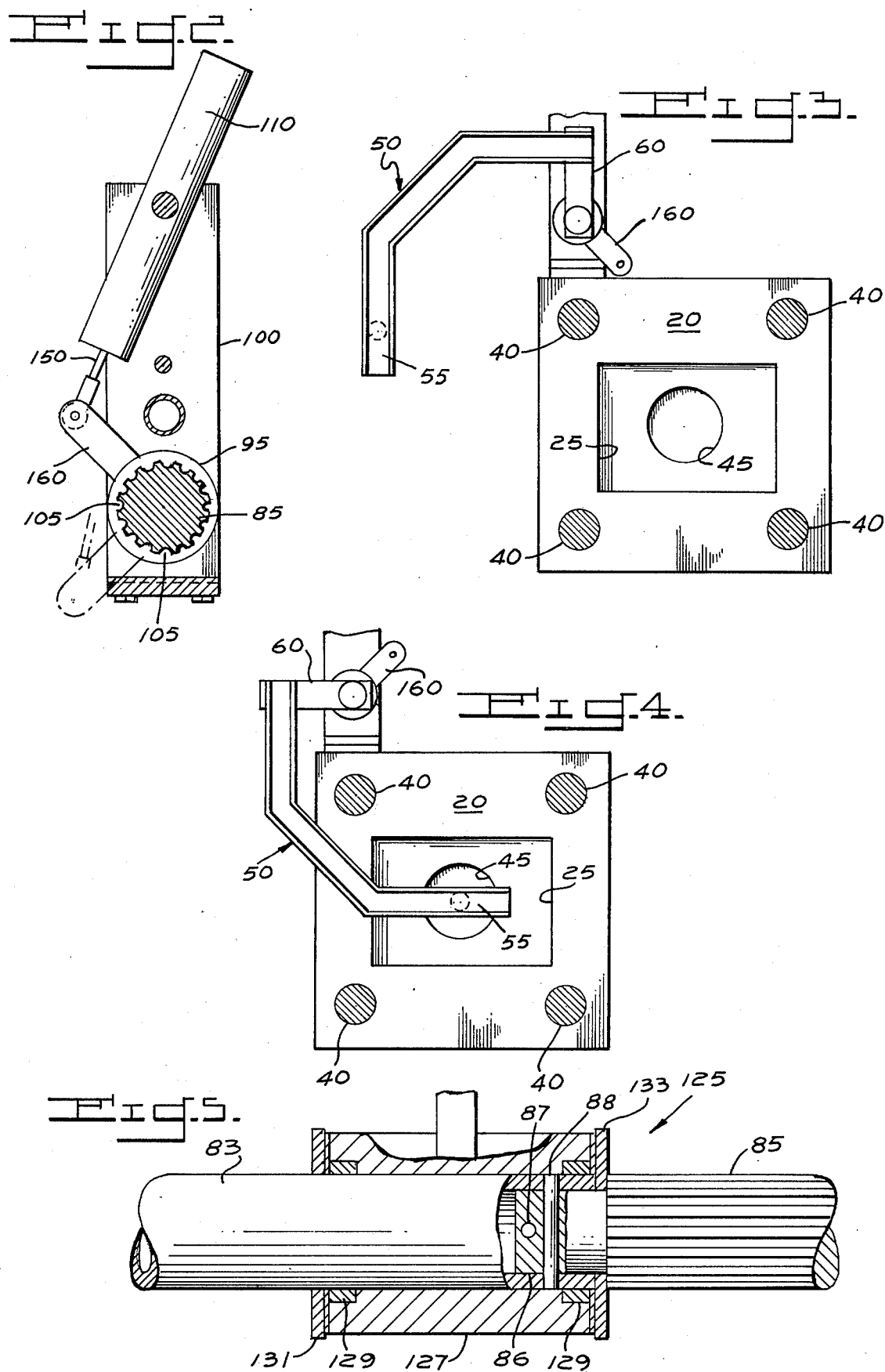

ARTICLE TRANSFERRING APPARATUS

BACKGROUND

This invention relates generally to apparatus for transferring an article between two mutually spaced locations and particularly to such an apparatus for removing a molded product from the mold cavity of an injection molding machine and depositing the product at a receiving station.

To meet mass production requirements, automatic injection molding machines which include stationary and reciprocal mold halves are often provided with apparatus for the removal of a molded part from one of the mold halves. Certain prior art removal apparatus comprised a plurality of ejector pins projectable into the mold cavity for dislodging the molded product therefrom as the mold halves separate subsequent to the molding operation. As the operating speeds of injection molding machines increased, such prior art removal apparatus often were found incapable of ejecting the molded product with speeds sufficient to consistently ensure the product clearing the mold halves as the mold halves were closed at the start of the next molding operation. Moreover, these prior art apparatus were only capable of dropping the product between the open mold halves and did not function to transfer the product to other locations remote from the injection molding machine.

To overcome these difficiencies, apparatus which seek to positively grip the product, remove the product from the open mold halves and transfer the product to locations remote from the injection molding machine have been developed. These apparatus or robots as they are sometimes known often include complex mechanical movements requiring the application of power to a plurality of movable components and are, therefore, costly to manufacture and service and quite susceptible to malfunction. Moreover, certain of these robots are synchronized with and driven by the molding machine through a mechanical linkage or connection therewith. Thus, it will be appreciated, that such robots must be designed for use with a particular injection molding machine and are neither controllable independent from the molding machine nor conveniently adaptable for use with other production machinery.

Accordingly, it is a principal object of the present invention to provide an article transferring apparatus which effectively removes molded parts from an automatic injection molding machine and deposits the parts at a remote receiving station.

It is another object of the present invention to provide an article transferring apparatus which effectively transfers a workpiece between two mutually spaced locations.

It is another object of the present invention to provide an article transferring apparatus which effectively transfers a workpiece between two mutually spaced locations at speeds complimentary to those at which modern production machinery operates.

It is another object of the present invention to provide an article transferring apparatus which is reliable and economic to manufacture and service.

It is another object of the present invention to provide an article transferring apparatus which is compact and readily adaptable to a variety of production machinery.

SUMMARY OF THE INVENTION

These and other objects will become more readily apparent from the following detailed description taken in connection with the accompanying drawings wherein there is disclosed an improved article transferring apparatus which includes a rotatable and longitudinally translatable shaft and a sweep arm fixed thereto. The sweep arm is adapted to carry any suitable means for holding the article or workpiece. The shaft is received within a bearing means which rotates with the shaft while allowing the longitudinal movement of the shaft therethrough. The shaft and thus the sweep arm and holding means are rotatable and translatable through a wide range of positions by a pair of independently operable drive motors, the first of which is connected to the shaft for imparting longitudinal movement thereto and the second of which is connected to the shaft through the bearing means for imparting rotational movement to the shaft. The article transferring apparatus is compact and adaptable to a wide variety of production machinery.

DESCRIPTION OF THE DRAWINGS

FIG. 1 is a side elevational view of the article transferring apparatus of the present invention operatively assembled with an injection molding machine;

FIG. 2 is a fragmentary, partially sectioned view of the article transferring apparatus taken along line 2—2 of FIG. 1;

FIG. 3 is a fragmentary view of the article transferring apparatus taken along line 3—3 of FIG. 1 illustrating a position occupied by the sweep arm during either the article forming operation by the molding machine or upon release of the molded article by the article transferring apparatus;

FIG. 4 is a fragmentary view similar to FIG. 3, but illustrating the position of the sweep arm during the removal of the molded article from a mold cavity; and FIG. 5 is an enlarged fragmentary and partially sectioned view of a portion of the article transferring apparatus.

DESCRIPTION OF THE PREFERRED EMBODIMENT

Referring to the drawings, and particularly to FIG. 1, the article transferring apparatus is shown generally at 10 operatively assembled with an injection molding machine illustrated generally at 15. However, it will be understood that the article transferring apparatus of the present invention may be employed in any environment wherein the transfer of an article or workpiece between two mutually spaced locations or work stations. Moreover, although the work transfer apparatus of the present invention is shown supported by the injection molding machine, it will be further understood that the article transferring apparatus may be provided with its own supports and located proximate to any manufacturing machine with which it is to be employed.

Injection molding machine 15 includes a stationary platen 20 supporting a first mold half 25 and a movable platen 30 carrying a second mold half 35 thereon. Platen 30 is supported for movement toward and away from platen 20 on rails 40 (see FIGS. 3 and 4) and is powered by any suitable means (not shown) such as a fluid motor. Together mold halves 25 and 35 define a mold cavity 45 into which molding material is injected, usually through stationary platen 20. In operation, the mold halves are brought together by the movement of platen 30 along rails 40. Molding material is then injected into mold cavity 45 wherein the material is shaped to a predetermined form. Finally, the mold halves are separated by movement of platen 30 along the rails, leaving the workpiece or molded article held, as by the sprue, within a portion of the cavity defined by one of the mold halves.

The molded article is effectively removed from the mold cavity by the article transferring apparatus of the present invention which comprises a sweep arm 50 of extended U-shape which, at end 55 thereof is adapted to carry suitable means (not shown) for gripping and holding the molded article. The article holding and gripping means may be of any variety known in the art, such as fluid powered gripping jaws, suction means or the like. The sweep arm of the preferred embodiment is formed from straight lengths of I-beams for high strength and minimum weight, but it will be appreciated that other constructions such as a tubular structure may be employed without departing from the present invention. The sweep arm is fixed to a supporting bracket 60 by any suitable fastening means and bracket 60 is in turn secured to a collar 65 which connects the sweep arm to a rotatable and longitudinally translatable drive shaft 70.

As best seen in FIG. 1, drive shaft 70 is disposed parallel to the direction of travel of movable mold carrying platen 30 and is supported for rotation and longitudinal translation by bearings 75 and 80. As best seen in FIGS. 1 and 5, shaft 70 includes a smooth walled tubular portion 83 and a splined portion 85, having an end 86 of reduced diameter received within the end of the smooth walled portion and pinned thereto at 87 and 88 (see FIG 5). Splined portion 85 is adapted for connection with drive means to be described hereinafter for rotatably driving the shaft and may be disposed within a housing 90 which allows the longitudinal and rotational movement of the shaft while shielding the splined portion from dirt and various other contaminants. The shaft is of a length sufficient to span the longitudinal component of the required displacement of sweep arm 50 and the article holding means thereto when the shaft is moved in a longitudinal direction by other drive means to be described in detail hereinafter.

Bearing 75 supports shaft 70 for longitudinal and rotational movement therethrough and in the preferred embodiment is supported on movable mold carrying platen 30. However, it will be appreciated that bearing 75 may be supported independently of molding machine 15 in proximity thereto. Bearing 75 may be of any known variety such as the type employing one or more races accommodating a plurality of ball or roller bearings.

Bearing 80 includes a hub 95 longitudinally fixed to and rotatably mounted on upstanding mounting bracket 100. As best seen in FIG. 2, the splined portion 85 of shaft 70 is slidably received within the hub interior which is provided with longitudinally extending teeth 105 which are received between the splines of portion 85. Thus, the interengagement of the toothed interior of hub 95 with splined portion 85 enables the shaft to rotate with the hub while allowing the shaft to slide longitudinally therethrough in locating the sweep arm and article holding means.

The article transferring apparatus of the present invention is powered by a pair of independently operable drive means comprising, in the preferred embodiment, first and second fluid motors 105 and 110, respectively. First fluid motor 105 is of the double acting type wherein hydraulic fluid is selectively admitted into and drained from the interior of the motor cylinder thereof on opposite sides of a piston (not shown) to effect the longitudinal movement of piston rod 112. The first fluid motor is disposed parallel to the longitudinal axis of shaft 70 and is mounted on upstanding bracket 100 as by a threaded connection therewith at 115.

Connection between piston rod 112 and shaft 70 is made through connecting arm 120 and bearing 125. Bearing 125 allows the rotation of shaft 70 therewithin while being operatively connected to the shaft for longitudinal translation therewith. A suitable construction for bearing 125 which achieves such a connection is shown in FIG. 5. Bearing 125 includes a cylindrical hub 127 having annular bearings 129 pressed into the ends thereof. Hub 127 surrounds the previously described connection of the splined and smooth walled portions of shaft 70, the shaft being freely rotatable on the bearings when driven in a manner to be described by motor 110. Hub 127 is connected to shaft 70 for longitudinal movement therewith by locking collars 131 and 133 secured to the shaft at smooth walled portion 83 and the connection of the smooth walled and splined portions.

The rotation of shaft 70 is affected by second fluid drive motor 110 which in the preferred embodiment is of the double acting type similar to first motor 105. Motor 110 is pivotally mounted on bracket 100 as by a pinned connection thereto at 145. Motor 110 includes piston rod 150 which connects to rotatable bearing hub 95 by means of a pivotal connection at 155 to a clevis 160 fixed to the hub at the outside thereof. Therefore, it will be seen that actuation of motor 110 wherein the extension and retraction of piston rod 150 is affected will cause the rotation of hub 95 and thus the rotation of shaft 70 by means of the splined connection between the shaft and hub.

As is well known in the art, motors 105 and 110 are actuated by the selective pressurization and drainage of the cylinders thereof with hydraulic fluid. This selective pressurization and drainage of the cylinders is controlled by any suitable control means such as solenoid actuated control valves (not shown). In such a system, the valves controlling the hydraulic fluid flow may be actuated by limit switches activated in response to the amount of extension of the motor piston rods. By way of example, FIG. 1 illustrates a plurality of limit switches 163, 165, 167 and 170 for controlling valves (not shown) which in turn control the pressurization and drainage of the cylinder of motor 105. The limit switches are adjustably supported on longitudinally extending arm 175 which is fixed to bracket 100, thereby enabling the adjustment of the length of travel of piston rod 110 and thus shaft 70. Each switch actuates corresponding solenoid valves (not shown) which control the flow of hydraulic fluid to and from motor 105. The switches are actuated by cam 180 carried on actuator arm 185. Arm 185 is longitudinally movable with piston rod 112 being connected thereto through connecting arm 120 and slidably supported on mounting bracket 100 at 187 and 190. Additional limit switches (not shown) may be provided to control the stroke of the piston rod of motor 110 and thus the amount of rotation of the shaft.

The operation of the article transferring apparatus is as follows. At the start of the molding operation, the sweep arm and shaft occupy the positions shown in FIG. 3, motor 110 positioning clevis 160 and hub 95 as best shown in solid lines in FIG. 2. Movable platen 30 traverses rails 40 movable mold half 35 into contact with mold half 25. Molding material is then injected into cavity 45 forming the molded article or workpiece. The movable mold half is then withdrawn from the stationary mold half, the molded article remaining held in one of the mold halves as by the sprue. Assuming for purposes of illustration that the molded article remains held in movable mold half 35, upon withdrawal of the movable mold half, first motor 105 is actuated causing the piston rod thereof and shaft 70 and sweep arm 50 to move toward the movable mold half. Second motor 110 is then forwardly actuated causing the piston rod thereof to move downwardly to the position illustrated in dotted lines in FIG. 2 and thereby causing the rotation of hub 95. This rotation of hub 95 causes the rotation of shaft 70 angularly positioning the sweep arm for engagement of the article holding and gripping means with the molded article. (See FIGS. 1 and 4.) First motor 105 is then further actuated to longitudinally move the shaft thereby bringing the article gripping and holding means into engagement with the molded article which is then stripped from the movable mold half by reverse actuation of motor 105 affecting the longitudinal movement of the shaft and sweep arm away from the movable mold half (to the right as viewed in FIG. 1). Reverse actuation of motor 110 retracts piston rod 150, thereby removing the sweep arm and gripping and holding means from the path of the movable platen to prevent interference with subsequent molding operations. Further reverse actuation of motor 105 in the manner described longitudinally positions the sweep arm and gripping means for release and deposit of the molded article at a predetermined location outside the path of the movable platen. Motor 105 by longitudinal movement of shaft 70 repositions the sweep arm and gripping and holding means in the locations occupied by those members in FIG. 3 for the start of the next article removal cycle. As set forth hereinabove, limit switches control the amount of shaft travel. The operation sequence may be normally controlled or automatically controlled by suitable programmable control means (not shown).

What is claimed is:

1. Apparatus for removing a molded part from an injection molding machine which includes a pair of separable mold halves and depositing the part at a location remote from the injection molding machine, said apparatus comprising:
 a shaft disposed parallel to the direction of parting of said mold halves, said shaft being longitudinally translatable and rotatable about the longitudinal axis thereof,
 a sweep arm connected to and supported by said shaft,
 part holding means carried by said sweep arm,
 a rotatable hub engaging said shaft at a splined interconnection therewith for rotational movement with said shaft while allowing said shaft to move longitudinally with respect to said hub,
 a first fluid motor connected to said shaft for imparting longitudinal movement thereto, thereby longitudinally positioning said sweep arm and said article holding means,
 a second fluid motor connected to said rotatable hub for imparting rotational movement to said shaft thereby rotationally positioning said sweep arm and said article holding means and,
 an upstanding mounting bracket, said rotatable hub and said first and second fluid motors being supported on said mounting bracket,
 whereby said first and second fluid motors position said part holding means for engagement with a molded part retained within one of said mold halves, remove said molded part from said one mold half and deposit said molded part at said remote location.

2. The apparatus of claim 1 wherein said second fluid motor is pivotally supported on said mounting bracket and includes a piston rod pivotally connected to said rotatable hub.

3. The apparatus of claim 1 and further including a bearing means carried by said shaft, said bearing means allowing the rotation of said shaft therewithin and being operatively connected to said shaft for longitudinal displacement therewith, said first fluid motor being connected to said shaft through said bearing means.

* * * * *